United States Patent [19]

Ricaud et al.

[11] Patent Number: 4,808,904
[45] Date of Patent: Feb. 28, 1989

[54] PORTABLE PHOTOVOLTAIC BATTERY RECHARGER

[75] Inventors: Alain M. Ricaud, Bethesda; Fiore Artigliere, Frederick, both of Md.

[73] Assignee: Solarex Corporation, Rockville, Md.

[21] Appl. No.: 147,548

[22] Filed: Jan. 25, 1988

[51] Int. Cl.[4] .................. H02J 7/00; H01M 10/44; H01L 31/04

[52] U.S. Cl. ........................ 320/2; 136/291; 320/15

[58] Field of Search .............. 320/2, 15, 61; 136/291, 136/289

[56] References Cited

FOREIGN PATENT DOCUMENTS 2912641 10/1980 Fed. Rep. of Germany ...... 136/291

OTHER PUBLICATIONS

*Electronics*, "Battery Charger Uses Solar Power", 2/1974.

*The Solarex Guide to Solar Electricity*, p. 42, 4/1979, Solarex Corp.

Primary Examiner—R. J. Hickey
Attorney, Agent, or Firm—Finnegan, Henderson, Farabow, Garrett & Dunner

[57] ABSTRACT

A portable photovoltaic battery recharger for simultaneously recharging a plurality of rechargeable batteries having different sizes and respective optimum charging current levels. The battery recharger includes a plurality of photovoltaic solar cells having a plurality of different selectively chosen surface areas for generating the respective optimum charging current levels when insolated, and battery receptacles for holding the plurality of rechargeable batteries in a recharging position. The plurality of solar cells are connected to the battery recepatcles to transmit the charging current generated by each photovoltaic cell to respective ones of the plurality of battery receptacles such that batteries held in the battery receptacles are charged at respective optimum charging current levels.

7 Claims, 3 Drawing Sheets

PORTABLE PHOTOVOLTAIC BATTERY RECHARGER

BACKGROUND OF THE INVENTION

1. Field of the Invention

The present invention relates to photovoltaic battery rechargers and particularly to a portable photovoltaic battery recharger for simultaneously recharging a plurality of batteries having different sizes and respective optimum charging current levels.

2. Description of the Related Art

Numerous photovoltaic battery recharging kits are known in the art which provide the capability of recharging batteries through the direct conversion of sunlight into electrical current. An example of such prior art solar energy rechargers is shown in U.S. Pat. No. 4,209,346 which describes a portable power supply for a rechargeable battery which includes an array of solar cells and a heat sink thermally engaging the cells and the batteries for transmission of power from the cells to the batteries.

However, these prior art attempts at providing a portable photovoltaic power source for recharging batteries are limited in that each is configured with a single array of commonly sized solar cells. The commonly sized solar cells of the array produce only a single charging current level since the charging current level is directly proportional to the surface area of the individual cells. Some of the prior art photovoltaic battery rechargers incorporate elaborate electrical circuitry for switching between selected ones of the commonly sized solar cells. However, such elaborate circuitry requires corresponding increases in cost and complexity of manufacture of the device.

Normally, each respective photovoltaic solar cell of the array of cells of the prior art rechargers is selected to provide a charging current level matched to whatever size battery is intended for use with the recharger. Thus, if any other size battery, other than the base line design battery, is connected to the portable power source, that battery is not recharged at the optimum recharging current level. Rather, either a higher or lower recharging current level, depending on the base line design, is provided to the battery, and may result in either degradation of the life of the rechargeable battery in the event the charging current level is higher than the optimum value, or an unnecessarily high recharging time to replenish the battery if the charging current level is less than the optimum value.

It is thus an object of the present invention to provide a portable photovoltaic battery recharger which simultaneously recharges a plurality of rechargeable batteries having different sizes and capacities at each battery's respective optimum charging current level.

It is a further object of the present invention to provide a photovoltaic battery recharger for simultaneously recharging a plurality of batteries of different sizes which is lightweight, portable, and simple in construction.

It is still a further object of the present invention to provide a photovoltaic battery recharger for simultaneously recharging a plurality of batteries of different sizes wherein the circuit means which connects the photovoltaic cells to the batteries is simple in construction, inexpensive to manufacture, and includes a means for preventing discharge of the batteries through the solar cells when the cells are not insolated.

Additional objects and advantages of the invention will be set forth in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects, and in accordance with the purposes of the invention as embodied and broadly described herein, a photovoltaic battery recharger for simultaneously recharging a plurality of rechargeable batteries having different sizes and respective optimum charging current levels is provided, comprising: a plurality of photovoltaic solar cell arrays corresponding to the number of different battery sizes, each of the cell arrays having a plurality of individual solar cells, each cell of a respective array having a selectively chosen surface area for generating the respective optimum recharging current level associated with the respective size battery when insolated. The battery recharger further includes a battery receptacle means for holding the plurality of rechargeable batteries in a recharging position, and circuit means for connecting the plurality of photovoltaic solar cell arrays to the battery receptacle means to recharge each of the different size batteries with its respective optimum charging current level.

It is further preferable that the photovoltaic battery recharger include a housing having a top cover and a base plate, with the top cover being pivotably attached at one end to the base plate. The battery recharger preferably further includes means for holding the top cover at a predetermined angle relative to the base plate, wherein the plurality of solar cell arrays is mounted on the top cover and the arrays may be selectively positioned for maximum insolation by pivoting the top cover about the base plate.

It is still further preferable that the photovoltaic battery recharger include a switch means for isolating the solar cell arrays and the battery receptacle means to prevent discharging of the batteries through the solar cells when the top cover is closed over the base plate.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

In accordance with the present invention there is provided a photovoltaic battery recharger for simultaneously recharging a plurality of rechargeable batteries having different sizes and respective optimum charging current levels which comprises a plurality of photovoltaic solar cell arrays. Each array includes a plurality of solar cells, and each cell of a respective array has a selectively chosen surface area for generating the respective optimum charging current levels associated with the different size batteries when the cells are insolated.

Figure 1:
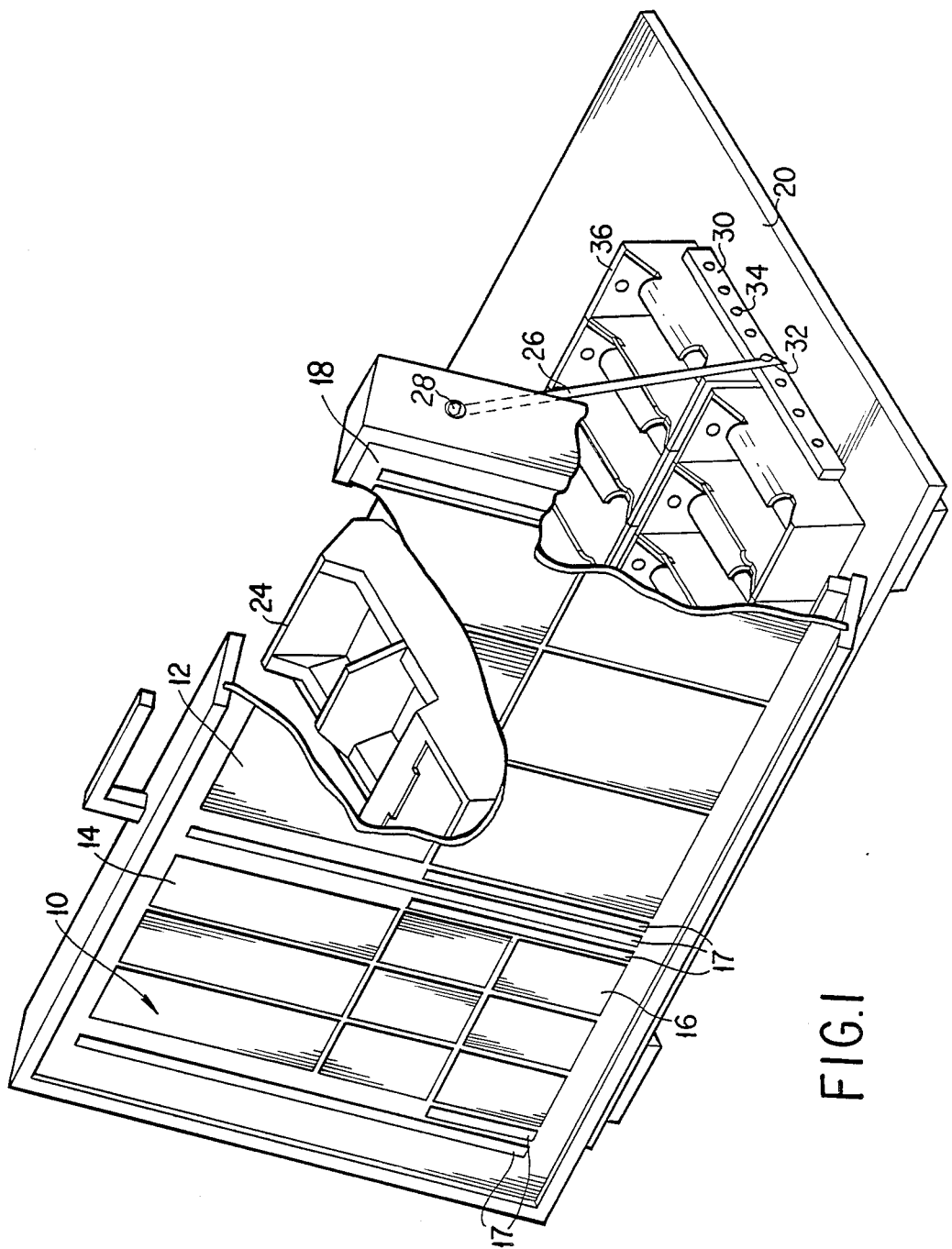
FIG. 1 is an isometric view of a portable battery recharger incorporating the teachings of the present invention.
Figure 2:
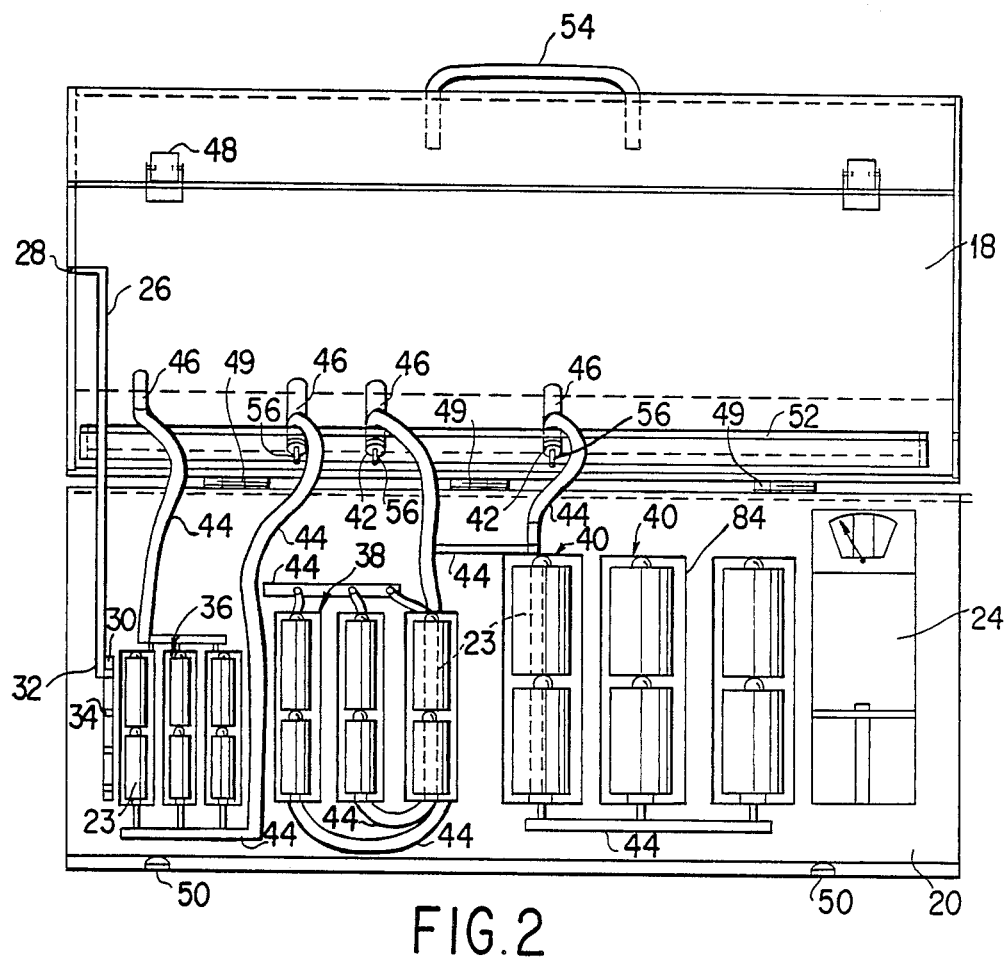
FIG. 2 is a front view of the portable photovoltaic battery recharger illustrated in FIG. 1.

As shown in FIGS. 1 and 2, the portable photovoltaic battery recharger broadly indicated by 10 includes first, second, and third size photovoltaic solar cells arrays 12, 14 and 16, respectively. Each array includes a plurality of solar cells, and each cell of a respective array has a selectively chosen surface area for providing a respective optimum charging current level when insolated, as discussed more fully below. Any conventional solar cells, including without limitation polycrystalline silicon, amorphous silicon and/or single crystal silicon cells may be utilized. The solar cells are disposed on a top cover 18 of recharger 10. The solar cells are connected to output terminals (not shown) by output connection strips 17. The portable battery recharger 10 further includes a base plate 20, pivotably connected to top cover 18 by brackets 49.

With continued reference to FIGS. 1 and 2, the portable battery recharger 10 further includes a battery test meter 24 mounted to base plate 20, and means for holding top cover 18 at a predetermined angle relative to base plate 20. As embodied herein, the holding means includes an armstand 26 pivotally connected to top cover 18 at connection 28, and an armstand mounting bracket 30, having a preselected number of set holes 34 therein, mounted on base plate 20. Set holes 34 are sized to accommodate distal end 32 of armstand 26 to hold top cover 18 in a plurality of angular orientations relative to base plate 20 as the top cover is pivoted about brackets 49 such that solar cell arrays 12, 14 and 16, disposed on the top surface of top cover 18, are positioned for maximum insolation.

With continued reference to FIG. 2, the portable photovoltaic battery charger 10 preferably further includes a handle 54 mounted on top cover 18, and latches 48 mounted on top cover 18 which engage with the catches 50 mounted on base plate 20 when the top cover is closed over the base plate. Thus, latches 48, catches 50 and handle 54 provide for easy transportation of battery recharger 10.

The photovoltaic battery recharger further includes battery receptacle means for holding the plurality of rechargeable batteries in a recharging position. As embodied herein, the receptacle means includes receptacles 36, 38, and 40 which are selectively sized to hold batteries 23 having different sizes and capacities. By way of example and not limitation, receptacles 36 may be sized to hold conventional AA size Ni—Cd batteries, receptacles 38 may be sized to hold conventional C size Ni—Cd batteries, and receptacles 40 may be sized to hold conventional D size Ni—Cd batteries. The size and number of batteries which the receptacles may be configured to hold is a matter of design choice and the present invention is not limited to conventional size batteries. Moreover, as shown in FIG. 2, battery receptacles 36, 38, and 40 are shown holding two batteries of a respective size in series in each receptacle. However, any number of batteries may be held by each receptacle.

Figure 4:
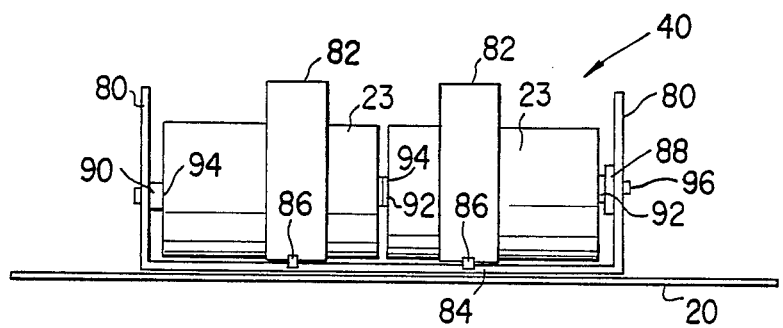
FIG. 4 of one of the battery receptacles included in the battery recharger of FIGS. 1 and 2.

With reference to FIG. 4, there is illustrated a side view of one of the battery receptacles shown in FIG. 2. Each of the receptacles 36, 38 and 40 have a similar construction with variations in the dimensions to accommodate the different size batteries. Therefore, only receptacle 40 will be described below as an example.

Receptacle 40, as shown in FIG. 2, includes end members 80 cantilevered from a base member 84. Base member 84 is secured to base plate 20 by adhesive or any other type of securing means. Lateral holding members 82 extend upwardly from base member 84 between end members 80. Lateral holding members 82 are secured to base member 84 by rivets 86, for example. A positive terminal 96 is fixed in one end member 80, and a negative terminal 90 is secured in the opposite end member 80.

Batteries 23, having a positive end 92 and a negative end 94, are placed in series between end members 80, and are held in place by lateral holding members 82 biasing against the sidewalls of the batteries 23. The positive end of one battery 23 contacts positive terminal 96 and is held against terminal 96 by a retaining piece 88. The negative end of the last battery in the series between end members 80 contacts negative terminal 90. Although receptacle 40 of FIG. 2 is configured to hold two batteries, any number of like-sized receptacles may be secured on base plate 20 such as is shown with continued reference to FIG. 2 wherein three receptacles 38 are illustrated. Moreover, although receptacle 40 is sized to hold two batteries in series, a single battery may be recharged when held in receptacle 40 by inserting a dummy device between end members 80 to complete the connection between the single battery and negative terminal 90.

Battery recharger 10 further includes circuit means for connecting the plurality of solar cell arrays to respective battery receptacles. As embodied herein, the circuit means includes electrical wire connections 44 and 46, and switches 42, which connect the output terminals (not shown) of respective solar cell arrays 12, 14, and 16 to respective receptacles 36, 38 and 40. Current generated by the photovoltaic solar cells when insolated is transmitted through electrical connections 46 and 44 to battery receptacle means 36, 38 and 40 to recharge batteries 23 mounted in the receptacles. A preferred embodiment of the circuit means is shown in the electrical schematic diagram illustrated in FIG. 3 and will be described in detail hereinafter. Briefly, the solar cells of a respective array are connected in series to provide a selectively chosen voltage through a respective circuit, and receptacles 36, 38 or 40, of a given size are connected in series-parallel to maintain the chosen voltage drop across two batteries of a given size in series and with multiples of two of the respective size batteries connected in parallel.

An extending portion 52 extends from top cover 18 and provides a mount for switches 42. By way of example and not limitation, switches 42 may be of a normally closed type such that when the top cover 18 is closed over base plate 20, buttons 56 contact base plate 20 and are pressed into the housing of switch 42 to electrically isolate the solar cells from the battery receptacles. In this manner the batteries held in battery receptacles 36, 38 and 40 do not discharge back through electrical wire connections 44 and 46 and the solar cells mounted in top cover 18.

Operation of the preferred embodiment of the portable battery recharger 10 as shown in FIGS. 1 and 2 will now be described. The photovoltaic solar cell arrays 12, 14 and 16 are selectively sized to provide chosen charging current levels when the cells are insolated. Current produced by insolation of a photovoltaic solar cell is directly proportional to the surface area of the cell. As shown in FIG. 1, solar cell arrays 12, 14 and 16 are configured as arrays of individual solar cells connected in series. Each individual cell of a respective array has a commonly sized surface area. Each individual cell thus provides a respective optimum charging current level selected in accordance with the size of the battery to which each array is connected. In the preferred embodiment of the invention illustrated in FIGS. 1 and 2, the solar cells are constructed of polycrystalline silicon which provides a potential voltage across each cell of approximately 0.42 V at their maximum power point output. Thus, the number of cells in a given array is selected in accordance with the voltage necessary to charge a given battery. Moreover, each respectively sized receptacle 36, 38 or 40 is connected in parallel to its commonly sized receptacles so as to maintain the voltage drop across each receptacle.

The charging current level provided by each respective array of differently sized solar cells is conducted to an output terminal (not shown) via output connection strips 17. Electrical wire connections 46 and 44 conduct the respective optimum charging current level generated by each array of solar cells to a respective battery receptacle 36, 38 or 40. When the arrays are insolated the charging current level provided by each array is matched to the optimum charging current level for a respective size battery 23. Typically, an optimum charging current level for a rechargeable battery is the capacity of the battery divided by 10. However, numerous factors may influence the selection of an optimum charging current level as described in more detail later in the specification.

Switches 42 provide a simple and inexpensive device for insuring that the charge accumulated in the batteries is not drained and discharged back through electrical connections 44 and 46 and solar cell arrays 12, 14 and 16 when the solar cells are not insolated. The normally closed switches 42 have no voltage drop compared to other devices such as a diode, and act to prevent discharge of the batteries when the cells are not insolated and top cover 18 is closed over base plate 20.

With the configuration as described with respect to the presently preferred embodiment of the invention illustrated in FIGS. 1 and 2, the battery recharger is capable of simultaneously recharging a plurality of batteries having different sizes and capacities at each battery's respective optimum charging current level. In this manner, the present invention eliminates the drawbacks of the prior art since any number of different size batteries may be charged simultaneously at their respective optimum charging current levels. As previously discussed, prior art devices used a single size solar cell array which provided only a single optimum recharging current level, or required an elaborate electrical system for switching between cells. Battery test meter or checker 24 disposed on base plate 20 is provided so that the charge level of the batteries may be periodically checked to determine when recharging is required.

Figure 3:
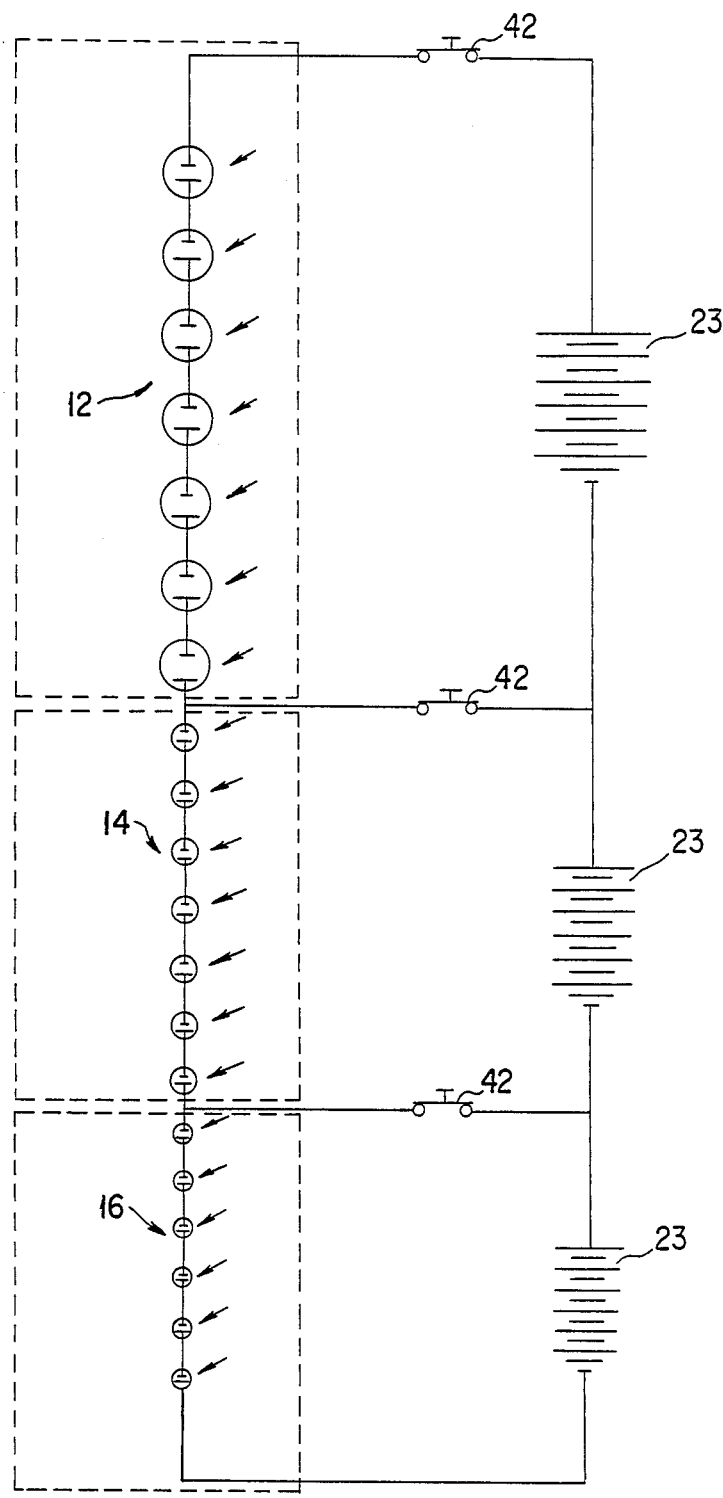
FIG. 3 is an electrical schematic of the circuit of the preferred embodiment of the present invention illustrated in FIGS. 1 and 2.

By way of example and not limitation, and with reference to FIG. 3, there is shown an electrical schematic representing the configuration of the presently preferred embodiment of the invention. As can be seen from inspection of the schematic, the first array 12 includes seven polycrystalline solar cells connected in series. By way of example, each cell of array 12 is sized with a surface area which produces a charging current level of approximately 1.20 amperes. Similarly, in the second and third arrays 14 and 16, the cells are sized to produce charging current levels of 0.60 amperes and 0.15 amperes, respectively In the preferred embodiment of the invention described herein, the solar cells are composed of polycrystalline silicon wafers. Each silicon solar cell produces an approximate potential across the cell of 0.42 volts at their maximum power point output, and a current which is proportional to the surface area of the cell. Typically, rechargeable batteries of the Ni—Cd type have a nominal potential across the battery of approximately 1.25 V and an end of charge potential of 1.47 V. Therefore, the number of solar cells of a selected size or surface area is chosen to provide a total potential sufficient to drive the optimum charging current level through the batteries, within ambient temperature limits between about 0°–40° C.

With reference to FIG. 2, each receptacle 36, 38 or 40 is configured to hold two batteries of a given size in series. Each receptacle of a given size is connected in parallel to the other receptacles of the same size. Thus, the voltage drop across each receptacle of a given size, such as receptacles 36, is constant. In the example described above in which the rechargeable batteries are of the Ni—Ca type having a voltage drop of about 1.25 V, since each receptacle holds two batteries in series, the voltage drop across a given receptacle is about 2.5 V. It will be appreciated by those skilled in the art that any number of receptacles connected in parallel may be used with the concepts of the present invention.

With continued reference to FIG. 3, the loops 60, 62 and 64 are stacked in parallel and each loop is connected to respective differently sized receptacles connected in parallel. Any number of batteries of a given size may be charged in each loop, with trade-offs in the required charging time as more batteries are connected in a loop.

Because in almost all applications, batteries are utilized in multiples of two, the organization of the battery assembly is arranged in such a way that the user can recharge batteries by multiples of two independently. The size of the solar cell surfaces are calculated in such a way that charging two batteries at a time will not be harmful to the batteries, an charging 2x batteries at a time will not take longer than approximately 10 hours of insolation.

By way of example and not limitation, and as shown in FIG. 3, seven cells of a selected size are provided in array 12, with the cells being connected in series to produce an output voltage of approximately 2.8 V and 1.20 A current through loop 60. Similarly, solar cell array 14 is configured with seven cells to produce an output voltage of approximately 2.8 V and 0.60 A current in loop 62. Solar cell array 16 is configured with six cells connected in series to produce an output voltage of approximately 2.8 V and 0.15 A current in loop 64. The latter cell array 16 is not working at its maximum power output in order to provide a lesser current in loop 64 because the optimum charging current for AA size batteries is 50 mA. Since a solar cell can provide lesser current at higher voltage, array 16 has been designed with a voltage drop of 467 mV per cell, requiring 6 cells in series, as a matter of commodity.

As will be apparent to one skilled in the art, numerous different circuit configurations may be employed in the present invention while utilizing the concepts embodied herein. The circuit configuration of the present preferred embodiment of the invention shown in FIG. 3, provides the advantage of simplicity and ease of construction and further requires only three switches 42, disposed in three of the parallel legs of loops 60, 62, and 64, to effectively isolate the batteries from the solar cell arrays 12, 14 and 16, when the cells are not insolated.

Switches 42 as shown in FIG. 3 are normally closed and are only open to isolate the solar cells from the battery receptacles when top cover 18 is closed over base plate 20 to depress buttons 56. As will be appreciated by those skilled in the art the examples described of the charging current levels of respective loops of FIG. 3 is not limitive of the present invention and any desired charging current level may be provided which can be selectively chosen in accordance with the capacity of the respective size batteries. Typically, an optimum recharging current level for a rechargeable battery is the capacity of the battery divided by 10. However, numerous factors may influence this optimum charging current level such as the temperature at which the batteries are charged, the desired charging time, and the expected life cycles of the rechargeable batteries.

Typically, Ni—Cd type batteries commonly used throughout the world for household purposes such as flashlights, radios, tape recorders, walkmans, toys, typewriters, etc., are sized to replace the most common types of throw-away batteries such as AA size (500 mAh), C size (1800 mAh) and D size (4000 mAh). Because the useage of disposable batteries is a very expensive proposition, approximately $300/kwh, cost can be reduced by a factor of 50 to approximately $6/kwh by using Ni—Cd rechargeable batteries with the photovoltaic battery recharger of the present invention. The present invention thereby meets an important need everywhere and everytime the user has no access to an electrical network, such as in third world countries and anywhere for recreational use and remote activities.

Additional advantages and modifications will readily occur to those skilled in the art. The invention in its broader aspects is, therefore, not limited to the specific details, representative apparatus, and illustrative examples shown and described. Accordingly, departures may be made from such details without departing from the spirit or scope of applicants' general inventive concept.

What is claimed is:

1. A portable photovoltaic battery recharger for simultaneously recharging a plurality of rechargeable batteries having different sizes and respective optimum charging current levels, comprising:
    a plurality of photovoltaic solar cell arrays corresponding to the number of different battery sizes, each of the cell arrays having a plurality of individual solar cells, each cell of a respective array having a selectively chosen surface area for generating said respective optimum charging current levels when insolated;
    battery receptacle means for holding said plurality of rechargeable batteries in a recharging position; and
    circuit means for connecting said plurality of photovoltaic solar cell arrays to said battery receptacle means to charge each of said different size batteries with said respective optimum charging current level.

2. The photovoltaic battery recharger of claim 1, including a housing having a top cover and a base plate, said top cover being pivotably attached at one end of said base plate, and means for holding said top cover at a predetermined angle relative said base plate, wherein said plurality of solar cell arrays is mounted on said top cover, said solar cell arrays being selectively positioned for maximum insolation by pivoting said top cover about said base plate.

3. The photovoltaic battery recharger of claim 2, including switch means for isolating said solar cell arrays and said battery receptacle means to prevent discharging of said batteries through said solar cells when said top cover is closed over said base plate.

4. The photovoltaic battery recharger of claim 1, including means, mounted in said housing, for checking the charge level of said batteries.

5. The photovoltaic battery recharger of claim 1, wherein said individual solar cells of a respective array are connected in series, and the number of individual cells of an array is chosen to provide a voltage drop across the array sufficient to charge the respective size batteries connected to the array.

6. The photovoltaic battery recharger of claim 1, wherein the surface are of said individual cells in said arrays is proportional to the optimum charging current level for the respective battery sizes.

7. A portable photovoltaic battery recharger for simultaneously recharging a plurality of rechargeable batteries having different sizes and respective optimum charging current levels, comprising:
    first and second photovoltaic cell arrays each array having a plurality of individual solar cells, each said individual solar cell of said first array having a first selectively chosen surface area for generating a first optimum recharging current level, and each said individual solar cell of said second array having a second selectively chosen surface area, different than said first surface area, for generating a second optimum recharging current level;
    battery receptacle means for holding a first size battery and a second size battery different from said first size battery; and
    circuit means for connecting said first photovoltaic cell array to said first size battery, and for connecting said second photovoltaic cell array to said second size battery to provide said first and second optimum charging current levels to respective ones of said first and second batteries.

* * * * *